(12) United States Patent
Oho et al.

(10) Patent No.: US 12,222,699 B2
(45) Date of Patent: Feb. 11, 2025

(54) MOTOR CONTROL DEVICE AND MOTOR CONTROL COMPUTER PROGRAM

(71) Applicant: FANUC CORPORATION, Yamanashi (JP)

(72) Inventors: Yusaku Oho, Yamanashi (JP); Naoto Sonoda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1007 days.

(21) Appl. No.: 16/836,796

(22) Filed: Mar. 31, 2020

(65) Prior Publication Data

US 2020/0319616 A1    Oct. 8, 2020

(30) Foreign Application Priority Data

Apr. 3, 2019    (JP) .................................. 2019-071530

(51) Int. Cl.
*G05B 19/25* (2006.01)
*G05B 19/4155* (2006.01)

(52) U.S. Cl.
CPC ....... *G05B 19/258* (2013.01); *G05B 19/4155* (2013.01); *G05B 2219/41144* (2013.01); *G05B 2219/42062* (2013.01)

(58) Field of Classification Search
None
See application file for complete search history.

(56) References Cited

U.S. PATENT DOCUMENTS

| | | | | |
|---|---|---|---|---|
| 4,885,793 A | * | 12/1989 | Tabuchi | ................ G11B 15/467 |
| 5,963,390 A | * | 10/1999 | Tabuchi | ............. G11B 15/4731 |
| 6,590,358 B1 | * | 7/2003 | Tsutsui | ..................... G05B 5/01 |
| | | | | 318/632 |
| 8,018,670 B1 | * | 9/2011 | Ito | .................... G11B 20/10388 |
| | | | | 702/109 |
| 2002/0045958 A1 | * | 4/2002 | Kamihira | ........... G05B 23/0267 |
| | | | | 700/83 |

(Continued)

FOREIGN PATENT DOCUMENTS

| | | |
|---|---|---|
| CN | 101893869 A | 11/2010 |
| CN | 102725956 A | 10/2012 |

(Continued)

*Primary Examiner* — David Earl Ogg
(74) *Attorney, Agent, or Firm* — HAUPTMAN HAM, LLP

(57) ABSTRACT

A control device calculates a position deviation between a position of a movable member designated by a position command and a measured position of the movable member by a position detector at each sampling period, adds a disturbance signal generated from a phase signal having a predetermined period to a drive signal generated from the position deviation to which an amount of correction is added, causes a motor for driving the movable member to operate based on the drive signal to which the disturbance signal is added, calculates the amount of correction by using a dynamic characteristic compensation filter in such a way as to reduce the position deviation, and changes a configuration of the dynamic characteristic compensation filter in such a way that an evaluation value related to magnitude of the position deviation satisfies a predetermined condition.

10 Claims, 5 Drawing Sheets

(56) References Cited

U.S. PATENT DOCUMENTS

| | | | |
|---|---|---|---|
| 2004/0240101 A1* | 12/2004 | Inaji | G11B 5/5582 |
| | | | 360/77.02 |
| 2007/0220073 A1* | 9/2007 | Traber | H03H 17/0288 |
| | | | 708/200 |
| 2010/0138045 A1* | 6/2010 | Chao | H02P 29/00 |
| | | | 318/494 |
| 2012/0306421 A1 | 12/2012 | Kessler et al. | |
| 2013/0106336 A1* | 5/2013 | Sonoda | G05B 19/404 |
| | | | 318/624 |
| 2016/0313726 A1 | 10/2016 | Iijima | |
| 2017/0123385 A1* | 5/2017 | Iijima | G05B 19/19 |
| 2018/0284702 A1* | 10/2018 | Sonoda | G05B 13/027 |

FOREIGN PATENT DOCUMENTS

| | | |
|---|---|---|
| CN | 103492962 A | 1/2014 |
| CN | 103633914 A | 3/2014 |
| CN | 104808694 A | 7/2015 |
| JP | S60107774 A | 6/1985 |
| JP | 2002304219 A | 10/2002 |
| JP | 2004-280772 A | 10/2004 |
| JP | 2005327191 A | 11/2005 |
| JP | 2008225533 A | 9/2008 |
| JP | 2009-122779 A | 6/2009 |
| JP | 106066636 A | 11/2016 |
| JP | 2017-84104 A | 5/2017 |
| WO | 2018163664 A1 | 9/2018 |

* cited by examiner

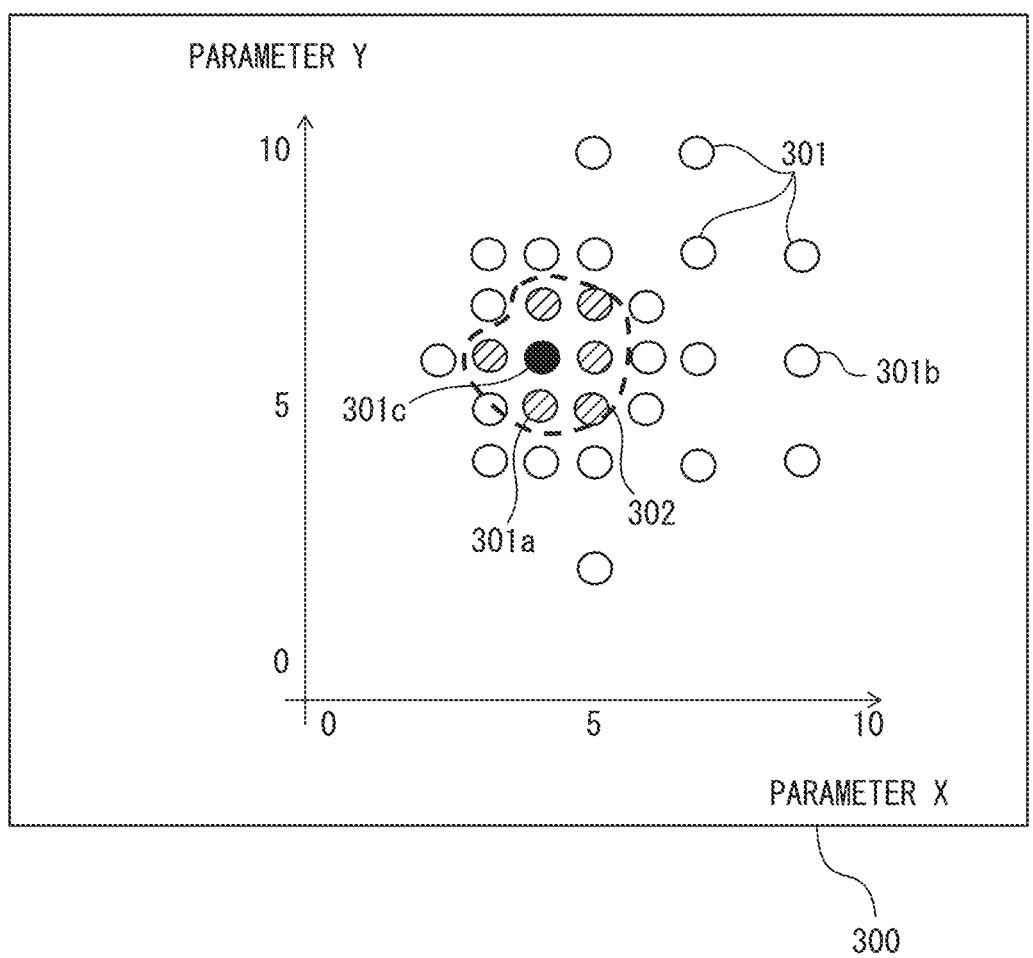

MOTOR CONTROL DEVICE AND MOTOR CONTROL COMPUTER PROGRAM

RELATED APPLICATIONS

The present application claims priority to Japanese Application Number 2019-071530, filed Apr. 3, 2019, the disclosure of which is hereby incorporated by reference herein in its entirety.

FIELD

The present invention relates to, for example, a control device of a motor and a motor control computer program used in such a control device.

BACKGROUND

In an automatic machine such as a robot or a machine tool including a movable member driven by using a servomotor, a same operation may be repeated in each predetermined period as in a case where a same processing is repeatedly performed on a workpiece. In such a case, reducing a position deviation between an individual target position of the movable member driven by the servomotor and an actual position of the movable member during a repetitive operation by applying so-called learning control has been proposed (see, for example, Japanese Unexamined Patent Publication (Kokai) No. 2004-280772).

For example, a servomotor drive control device described in Japanese Unexamined Patent Publication (Kokai) No. 2004-280772 obtains a position deviation of a predetermined position in a reference position being output in synchronization with a drive of a servomotor from a position deviation obtained at sampling and the reference position, adds the position deviation to corresponding correction data, and filters the correction data to update corresponding correction data stored in a memory means that corresponds to the position. Further, the drive control device obtains correction data at sampling from the correction data corresponding to the position being stored in the memory means and the reference position, obtains an amount of correction by compensating for a dynamic characteristic of the correction data, and adds the amount of correction to the position deviation.

In such learning control, a technique capable of setting a more appropriate control condition of a servomotor or selecting a learning parameter that matches a mechanical characteristic or an operation condition has been proposed (see, for example, Japanese Unexamined Patent Publication (Kokai) No. 2017-84104 and Japanese Unexamined Patent Publication (Kokai) No. 2009-122779).

For example, a servo control device described in Japanese Unexamined Patent Publication (Kokai) No. 2017-84104 calculates, from output of a position control loop when a sine wave is input to the position control loop, an evaluation value indicating a position control characteristic with a learning controller, based on an actually measured frequency characteristic and a frequency characteristic of the learning controller in relation to a gain and a phase of a position control loop input-output signal. Then, the control device changes a configuration of at least one of a band limit filter that constitute the learning controller, based on the evaluation value and a dynamic characteristic compensation filter.

Further, a control support device described in Japanese Unexamined Patent Publication (Kokai) No. 2009-122779 automatically sets an adjustment parameter and an adjustment condition related to the adjustment parameter, based on a result of performing a simulation when the electric motor is controlled to a predetermined target operation by using an arithmetic model acquired by modeling an operation of an electric motor in a servo system and a simulation condition being a simulated adjustment parameter condition for carrying out a simulation of an adjustment parameter for adjusting a control response of the electric motor.

SUMMARY

In the technique described in Japanese Unexamined Patent Publication (Kokai) No. 2017-84104, disturbance formed of a sine wave is input to a position deviation acquisition unit of the position control loop, and thus an evaluation is made when disturbance formed into a sine wave is applied to a position deviation itself. However, in a case where a position deviation is not limited to being periodic even when disturbance itself is periodic, the technique may not optimize a configuration of the dynamic characteristic compensation filter in such a way as to suppress an influence of the disturbance.

Further, in the technique described in Japanese Unexamined Patent Publication (Kokai) No. 2009-122779, an adjustment parameter and the like are set by a simulation, and thus an actual mechanical characteristic or an operation characteristic of a servomotor, or a movable member driven by the servomotor is not accurately evaluated. As a result, the adjustment parameter may not be optimized.

In one aspect, an objective is to provide a control device of a motor that can improve position control precision when a movable member driven by the motor is caused to repeat a certain operation.

According to an embodiment, a control device of a motor that drives a movable member periodically operating is provided. The control device includes: a processor configured to: generate a phase signal having a predetermined period; generate a disturbance signal repeated in the predetermined period, based on the phase signal; for each predetermined sampling period, calculate a position deviation between a position of the movable member designated by a position command and a position of the movable member measured by a position detector, add an amount of correction for correcting the position deviation to the position deviation, add the disturbance signal to a drive signal for driving the motor being generated based on the position deviation to which the amount of correction is added, and cause the motor to operate based on the drive signal to which the disturbance signal is added; calculate the amount of correction by using a dynamic characteristic compensation filter for compensating for a dynamic characteristic of a control system of the motor in such a way as to reduce the position deviation; calculate, for each repetitive period including at least one of the predetermined periods, an evaluation value representing magnitude of the position deviation at each of the predetermined sampling periods in the repetitive period; and change a configuration of the dynamic characteristic compensation filter in such a way that the evaluation value satisfies a predetermined condition.

According to another embodiment, a non-transitory recording medium that stores a motor control computer program for controlling a motor that drives a movable member repeating a certain operation is provided. The motor control computer program causes a computer to execute: generating a phase signal having a predetermined period; generating a disturbance signal repeated in the predetermined period, based on the phase signal; calculating, for each predetermined sampling period, a position deviation between a position of the movable member designated by a position command and a position of the movable member measured by a position detector, adding an amount of correction for correcting the position deviation to the position deviation, adding the disturbance signal to a drive signal for driving the motor being generated based on the position deviation to which the amount of correction is added, and causing the motor to operate based on the drive signal to which the disturbance signal is added; calculating the amount of correction by using a dynamic characteristic compensation filter for compensating for a dynamic characteristic of a control system of the motor in such a way as to reduce the position deviation; calculating, for each repetitive period including at least one of the predetermined periods, an evaluation value representing magnitude of the position deviation at each of the predetermined sampling periods in the repetitive period; and changing a configuration of the dynamic characteristic compensation filter in such a way that the evaluation value satisfies a predetermined condition.

According to one aspect, position control precision can be improved when a movable member driven by the motor is caused to repeat a certain operation.

BRIEF DESCRIPTION OF DRAWINGS

FIG. 3 is a diagram illustrating one example of a display of a value of a parameter being a change target of a dynamic characteristic compensation filter.

DESCRIPTION OF EMBODIMENTS

A control device of a motor according to an embodiment of the present invention will be described below with reference to the drawings. The control device controls a motor (for example, a servomotor) for driving a movable member of an automatic machine such as a robot or a machine tool. Particularly, the control device optimizes a filter for compensating for a dynamic characteristic of a control system of the motor (hereinafter, simply referred to as a dynamic characteristic compensation filter) with respect to periodic disturbance applied when the movable member is caused to repeat a same operation in each constant operation period. To achieve this, the control device generates a disturbance signal of a predetermined period that represents periodic disturbance in a pseudo manner when calibration processing is executed. Then, the control device operates the motor in addition to applying the disturbance signal to a speed command or a current command obtained from a position command that designates an amount of target rotation of the motor (i.e., a target position of the movable member driven by the motor). Moreover, the control device optimizes a configuration of the dynamic characteristic compensation filter in such a way that an evaluation value representing magnitude of a position deviation between an actual measurement position of the motor and a position designated by the position command satisfies a predetermined condition. Then, the control device applies the optimized configuration of the dynamic characteristic compensation filter when the movable member works on a workpiece.

For example, a vibration in a period different from that of disturbance may appear in a position deviation due to a nonlinear vibration by a mechanical resonance or a backlash. Further, learning control has a property of amplifying disturbance that does not synchronize with a repetitive operation. In the prior art described above, when these phenomena occur, a position deviation may not be suppressed. However, the control device according to the present embodiment can optimize the configuration of the dynamic characteristic compensation filter in such a way as to be able to reduce a position deviation even when these phenomena occur.

Figure 1:
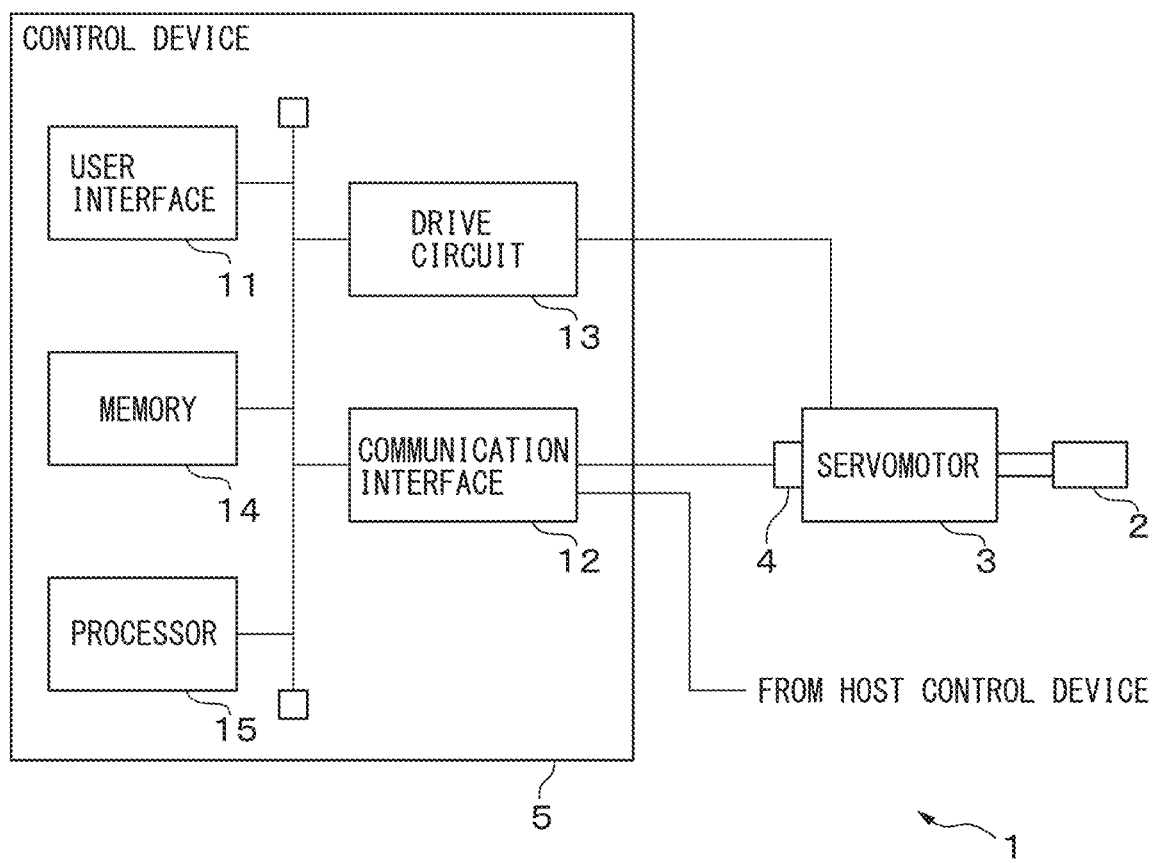
FIG. 1 is a schematic configuration diagram of a motor control system and a control device included in the motor control system according to an embodiment.

FIG. 1 is a schematic configuration diagram of a motor control system 1 and a control device 5 included in the motor control system 1 according to one embodiment. The motor control system 1 includes a movable member 2, a servomotor 3 that drives the movable member 2, a position detector 4 for measuring an amount of rotation from a reference position of the servomotor 3, i.e., a position of the movable member 2, and the control device 5.

The movable member 2 is, for example, a tool provided on a machine tool or a robot, and is directly attached to a rotating shaft of the servomotor 3 or is indirectly attached thereto via a gear and the like. Then, the movable member 2 is driven by the servomotor 3, and repeats a same operation in each constant operation period in such a way as to perform same processing on an individual workpiece (not illustrated).

The servomotor 3 is one example of a motor, and drives the movable member 2 by rotating according to a drive current supplied from the control device 5.

The position detector 4 is, for example, an encoder or a resolver, and is attached to the rotating shaft of the servomotor 3. Then, the position detector 4 measures an amount of rotation (i.e., an actual position of the movable member 2) from a reference position of the servomotor 3, and outputs the measurement value to the control device 5.

The control device 5 controls the servomotor 3 to cause the movable member 2 attached to the servomotor 3 to perform a predetermined operation. In the present embodiment, the control device 5 reduces a position deviation between a target position of the movable member 2 and an actual position in each predetermined sampling period during performing the predetermined operation, by applying so-called learning control to control of the servomotor 3.

To achieve this, the control device 5 includes a user interface 11, a communication interface 12, a drive circuit 13, a memory 14, and a processor 15.

The user interface 11 includes, for example, an input device such as a keyboard or a mouse, and a display device. Alternatively, the user interface 11 may include a device in which the input device and the display device are integrally formed, such as a touch panel display. Then, the user interface 11 generates an operation signal representing an operation in such a way as to start or stop an operation of the servomotor 3 in accordance with an operation by a user, and passes the operation signal to the processor 15. Further, the user interface 11 displays various pieces of display information received from the processor 15. The display information includes, for example, information representing an operation situation of the servomotor 3 or the movable member 2, information representing a relationship between an evaluation value of a position deviation and each parameter value of a parameter set that defines a configuration of a dynamic characteristic compensation filter during execution of calibration processing, and the like.

The communication interface 12 includes, for example, a communication interface for connecting the control device 5 to a communication line, a circuit for executing processing related to transmission and reception of a signal via a communication line, and the like. Then, for example, the communication interface 12 receives, from a host control device (not illustrated), a series of position commands and the like that designate an individual target position during a predetermined operation when the movable member 2 is caused to perform the predetermined operation, and passes the received position command to the processor 15. Furthermore, the communication interface 12 includes an interface for connecting a signal line from the position detector 4, and passes, to the processor 15, a measurement value of a position of the movable member 2 each time the communication interface 12 receives the measurement value from the position detector 4.

The drive circuit 13 includes a circuit for supplying electric power to the servomotor 3. Then, the drive circuit 13 is connected to the servomotor 3 via a current supply cable, and supplies, to the servomotor 3, electric power in accordance with torque to be generated by the servomotor 3, a rotation direction, or a rotation speed in accordance with a current command received from the processor 15.

The memory 14 is one example of a storage unit, and includes, for example, a readable-writable semiconductor memory and a read-only semiconductor memory. Furthermore, the memory 14 may include a storage medium such as a semiconductor memory card, a hard disk, or an optical storage medium, and a device that accesses the storage medium.

The memory 14 stores various computer programs (i.e., a computer program for controlling the servomotor 3) that are executed on the processor 15 of the control device 5. Further, the memory 14 stores correction data for correcting a position deviation between a target position of the movable member 2 and an actual position when the servomotor 3 is caused to perform a predetermined operation, a parameter set that defines a configuration of the dynamic characteristic compensation filter for compensating for a dynamic characteristic of a control system of the servomotor 3 achieved by the motor control system 1, and the like.

The processor 15 is one example of a control unit, and includes, for example, a central processing unit (CPU) and a peripheral circuit of the CPU. Furthermore, the processor 15 may include a processor for a numerical operation. Then, the processor 15 executes learning control on the entire motor control system 1, to execute learning control processing that causes the servomotor 3 and the movable member 2 to repeatedly execute a predetermined operation. Further, the processor 15 executes the calibration processing for calibrating the dynamic characteristic compensation filter.

Figure 2:
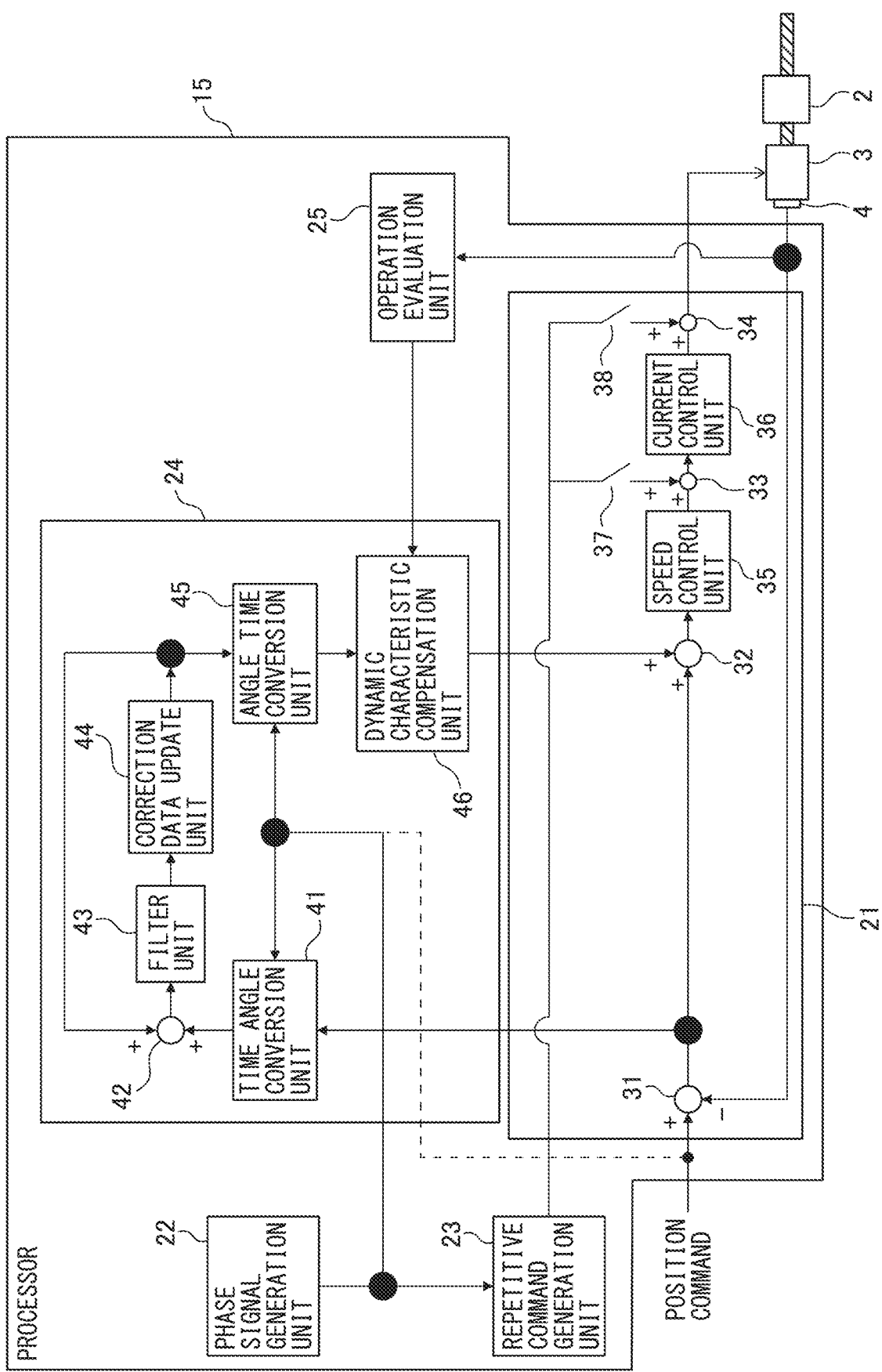
FIG. 2 is a functional block diagram of a processor of the control device in relation to learning control processing and calibration processing.

FIG. 2 is a functional block diagram of the processor 15 in relation to the learning control processing and the calibration processing. The processor 15 includes a drive signal generation unit 21, a phase signal generation unit 22, a repetitive command generation unit 23, a learning control unit 24, and an operation evaluation unit 25. Each of these units of the processor 15 is, for example, a functional module achieved by a computer program executed on the processor 15. Alternatively, each of these units may be mounted as a dedicated arithmetic circuit mounted on a part of the processor 15. Note that, of each of these units of the processor 15, the phase signal generation unit 22, the repetitive command generation unit 23, and the operation evaluation unit 25 are used in the calibration processing. On the other hand, the drive signal generation unit 21 and the learning control unit 24 are used in both of the calibration processing and the learning control processing. Note that, when processing to be applied is not stated clearly in the following description, the same control is executed in both of the calibration processing and the learning control processing. Note that, in FIG. 2, illustration of the drive circuit 13 is omitted for simplification.

The drive signal generation unit 21 generates a drive signal for driving the servomotor 3 in each predetermined sampling period (i.e., each control period for controlling the servomotor 3) shorter than a period of a repetitive operation of the movable member 2 (hereinafter, referred to as an operation period). Then, the drive signal generation unit 21 causes the servomotor 3 to operate by outputting the generated drive signal to the drive circuit 13. To achieve this, the drive signal generation unit 21 includes a subtractor 31, three adders 32 to 34, a speed control unit 35, a current control unit 36, and two switches 37 and 38. Then, the drive signal generation unit 21 causes the servomotor 3 to operate in accordance with position loop control and speed loop control.

The subtractor 31 calculates a difference (position deviation) between a target position of the movable member 2 represented by a position command from the host control device and a measurement value of an actual position of the movable member 2 received from the position detector 4, at each predetermined sampling period, and outputs the calculated position deviation to the adder 32 and the learning control unit 24.

Each time the adder 32 receives the position deviation from the subtractor 31, the adder 32 corrects the position deviation by adding an amount of correction received from the learning control unit 24 to the position deviation. Then, the adder 32 outputs the corrected position deviation to the speed control unit 35.

Each time the speed control unit 35 receives the corrected position deviation, the speed control unit 35 calculates a speed command by multiplying the corrected position deviation by a position gain. Note that the speed command is one example of a drive signal for driving the servomotor 3. Then, the speed control unit 35 outputs the speed command to the adder 33.

The adder 33 adds, when the switch 37 is ON during execution of the calibration processing, each time the adder 33 receives the speed command, periodic disturbance to the speed command by adding a value at the sampling period of a disturbance signal generated by the repetitive command generation unit 23 to a speed command value represented by the speed command. Then, the adder 33 outputs the speed command to which the periodic disturbance is added to the current control unit 36. On the other hand, when the switch 37 is OFF during execution of the calibration processing, or during execution of the learning control processing, each time the adder 33 receives the speed command, the adder 33 outputs the received speed command as it is to the current control unit 36.

Each time the current control unit 36 receives the speed command, the current control unit 36 obtains a speed deviation being a difference between the speed command value represented by the speed command and an actual speed of the servomotor 3, and calculates a current command by executing speed loop control such as proportional integral control on the speed deviation. Note that the current command is another example of a drive signal for driving the servomotor 3. Further, for example, an actual speed of the servomotor 3 is calculated from a position of the servomotor at each sampling period detected by the position detector 4. Alternatively, a rotation speed sensor (not illustrated) for detecting a rotation speed of the servomotor 3 may be provided, and an actual rotation speed of the servomotor 3 may be measured by the rotation speed sensor. The current control unit 36 outputs the current command to the adder 34.

The adder 34 adds, when the switch 38 is ON during execution of the calibration processing, each time the adder 34 receives the current command, periodic disturbance to the current command by adding a value at the sampling period of a disturbance signal generated by the repetitive command generation unit 23 to a current command value represented by the current command. Then, the adder 34 outputs the current command to which the periodic disturbance is added to the drive circuit 13. On the other hand, when the switch 38 is OFF during execution of the calibration processing, or during execution of the learning control processing, each time the adder 34 receives the current command, the adder 34 outputs the received current command as it is to the drive circuit 13.

Any one of the two switches 37 and 38 is set to ON and the other is set to OFF during execution of the calibration processing. Which of the two switches is ON is determined, for example, in accordance with an operation of a user via the user interface 11 or in accordance with a computer program for the calibration processing. For example, when a load on the servomotor 3 is relatively great, and a position deviation in response to disturbance cannot be accurately evaluated even by applying the disturbance to the current command, the switch 37 is turned ON, and the disturbance is added to the speed command. On the other hand, when a load on the servomotor 3 is relatively small, the switch 38 is turned ON, and the disturbance is added to the current command. In this way, the control device 5 can more precisely optimize the dynamic characteristic compensation filter with respect to the periodic disturbance. Note that, when the learning control processing is executed, both of the two switches 37 and 38 are set to OFF.

The phase signal generation unit 22 generates, in each predetermined generation period, a phase signal that has a predetermined period and represents a phase (for example, any value included in a range of 0 to $2\pi$ (or 0° to 360°)) in the predetermined period, during execution of the calibration processing. The predetermined period can be identical to, for example, a period of periodic disturbance assumed to be applied to an operation of the servomotor 3 when the movable member 2 performs work on a workpiece, and can be identical to, for example, an operation period of the movable member 2. Further, the predetermined period may be different from the operation period of the movable member 2 when the period of the periodic disturbance assumed to be applied to the servomotor 3 can be acquired by the learning control unit 24. For example, when disturbance in response to a rotation angle relative to a workpiece is applied to a tool that causes the servomotor 3 to operate in processing of rotating the workpiece and the tool relatively, the predetermined period can be identical to an assumed rotation period of the workpiece. Further, the predetermined generation period may be identical to or different from the sampling period described above. Note that, the generation period is preferably shorter than the sampling period in order that a disturbance signal accurately simulates periodic disturbance generated when the movable member 2 performs work on a workpiece.

Each time the phase signal generation unit 22 generates a phase signal, the phase signal generation unit 22 outputs the generated phase signal to the repetitive command generation unit 23 and the learning control unit 24.

The repetitive command generation unit 23 generates a disturbance signal that simulates periodic disturbance generated when the movable member 2 performs work on a workpiece, based on the phase signal, during execution of the calibration processing. The periodic disturbance is represented as a sine wave or a triangle wave, for example. Then, each time the repetitive command generation unit 23 receives the phase signal, the repetitive command generation unit 23 generates the disturbance signal in such a way as to set a phase of the disturbance signal to a phase represented by the phase signal, and outputs the generated disturbance signal. The disturbance signal output from the repetitive command generation unit 23 is added to the speed command or the current command by the adder 33 or the adder 34 via any of the two switches 37 and 38.

The learning control unit 24 calculates an amount of correction for correcting a position deviation in each predetermined sampling period. To achieve this, the learning control unit 24 includes a time angle conversion unit 41, an adder 42, a filter unit 43, a correction data update unit 44, an angle time conversion unit 45, and a dynamic characteristic compensation unit 46.

The time angle conversion unit 41 associates, each time a position deviation is input during the calibration processing, the position deviation with any of a plurality of phase sections being units in which correction data are prepared. For example, m (m is two or more integers, such as 72, 180, and 360) phase sections having lengths equal to each other are set to one period of 0 to 360° of a phase signal. Each time a position deviation is input, the time angle conversion unit 41 specifies a phase section including a phase represented by a phase signal when the position deviation is input, and associates the position deviation with the specified phase section. For example, when a phase is represented by 0.1° unit (i.e., a phase is represented by a value of 0 to 3599) in a phase signal, and a length of each phase section is 1° (i.e., 360 phase sections are present), the time angle conversion unit 41 can specify, from a value acquired by dividing a value of a phase represented by the phase signal by 10 (=1°/0.1°), a phase section including the phase.

Further, each time a position deviation is input during execution of the learning control processing, the time angle conversion unit 41 specifies, based on a reference position (for example, a target position designated by a position command or a position of the movable member 2 measured by the position detector 4) at the time of input of the position deviation, a phase section corresponding to the position among a plurality of phase sections. Then, the time angle conversion unit 41 associates the input position deviation with the specified phase section. In this case, the time angle conversion unit 41 can specify a corresponding phase section by multiplying, by the number of phase sections, a ratio of an order of position commands at the time of input of the position deviation from a start of one predetermined repetitive operation to a total number of position commands for causing the movable member 2 to execute the one predetermined repetitive operation. Alternatively, the time angle conversion unit 41 can specify a corresponding phase section by multiplying, by the number of phase sections, a ratio of a movement distance of the movable member 2 from a movement start position of the movable member 2 when the servomotor 3 is caused to execute a predetermined operation to a reference position at the time of input of the position deviation to a movement distance from the movement start position to a movement completion position. Further, when there is a different motor that operates in synchronization with the movable member 2 when the servomotor 3 is caused to execute a predetermined operation, the time angle conversion unit 41 can specify a phase section with, as a reference position, a position command to the different motor operating in synchronization or a measured position. Furthermore, when the predetermined repetitive operation of the movable member 2 is performed by superimposing a repetitive command based on a predetermined phase signal on a position command by the host control device or superimposing a repetitive command based on a phase signal generated by the phase signal generation unit 22 on a position command by the motor control device, the time angle conversion unit 41 can specify a phase section from the phase signal, similarly to the time of execution of the calibration processing. In addition, when a plurality of periods (i.e., periods of a disturbance signal) of a phase signal are included in one repetitive operation of the movable member 2, the time angle conversion unit 41 can specify a phase section corresponding to a reference position by referring to a reference table that is previously stored in the memory 14 and represents a correspondence between the reference position and the phase section. Alternatively, the time angle conversion unit 41 obtains a number being a residue when the number of reception times of a position command during movement from the movement start position of the movable member 2 to the reference position is divided by the number of reception times of a position command corresponding to one period of a phase signal. Then, the time angle conversion unit 41 can specify a corresponding phase section by multiplying the number being the residue by a ratio of the number of phase sections to the number of reception times of the position command corresponding to one period of the phase signal.

The time angle conversion unit 41 outputs, to the adder 42, the input position deviation and also information representing the specified phase section corresponding to the position deviation.

Each time the position deviation is input, the adder 42 reads, from the memory 14, correction data before one period of the phase signal about the phase section corresponding to the position deviation, and adds the read correction data to the input position deviation. Then, the adder 42 outputs, to the filter unit 43, the position deviation to which the correction data before one period is added together with information representing the corresponding phase section.

Each time the position deviation to which the correction data before one period is added is input, the filter unit 43 updates correction data by applying a low-pass filter to the position deviation in such a way as to attenuate a high frequency component. Note that the low-pass filter can be, for example, a finite impulse response (FIR) filter. Then, the filter unit 43 outputs, to the correction data update unit 44, the updated correction data together with information representing the corresponding phase section.

Each time the correction data update unit 44 receives the updated correction data, the correction data update unit 44 writes the updated correction data in association with the corresponding phase section to the memory 14.

Similarly to the time angle conversion unit 41, the angle time conversion unit 45 specifies a phase section corresponding to a reference position or a phase signal when a position deviation is input. Then, the angle time conversion unit 45 reads correction data corresponding to the specified phase section from the memory 14, and passes the read correction data to the dynamic characteristic compensation unit 46.

Each time a position deviation is input to the learning control unit 24, the dynamic characteristic compensation unit 46 calculates an amount of correction for the position deviation by applying the dynamic characteristic compensation filter to the correction data obtained by the angle time conversion unit 45. Then, the dynamic characteristic compensation unit 46 outputs the calculated amount of correction to the adder 32 of the drive signal generation unit 21.

The dynamic characteristic compensation filter used by the dynamic characteristic compensation unit 46 can be, for example, an FIR phase lead filter for compensating for a phase lag of correction data. Furthermore, the dynamic characteristic compensation unit 46 may use, as the dynamic characteristic compensation filter, a band limit FIR filter having a linear phase characteristic together with the phase lead filter. Note that, for these filters, refer to Inoue and others, "High Precision Control of Playback Servo System", The Institute of Electrical Engineers of Japan Journal C, Vol. 101, No. 4, p. 89 to 96, 1981, for example. As described later in detail, a parameter set that defines a configuration of the dynamic characteristic compensation filter such as the number of taps of the dynamic characteristic compensation filter, a weighting factor of each order, or the number of weighting factors having a value other than 0 among weighting factors of each of orders is optimized by the operation evaluation unit 25 in the calibration processing, and is stored in the memory 14. The dynamic characteristic compensation unit 46 may read the parameter set that defines the configuration of the dynamic characteristic compensation filter from the memory 14, and use the parameter set.

Each time a predetermined number (for example, 1, 5, 10, etc.) of periods of phase signals are generated in the calibration processing, i.e., each repetitive period, the operation evaluation unit 25 calculates an evaluation value representing magnitude of a position deviation at each predetermined sampling period in the repetitive period, and changes the configuration of the dynamic characteristic compensation filter in such a way that the evaluation value satisfies a predetermined condition. Note that, for example, the predetermined condition is a condition where a position deviation converges to equal to or less than a predetermined value when the learning control processing is executed.

The evaluation value can be, for example, a root mean square value of a position deviation calculated for each of a series of position commands at each sampling period included in a repetitive period of a phase signal, or a sum of absolute values of position deviations.

Each time the operation evaluation unit 25 calculates an evaluation value, the operation evaluation unit 25 changes at least one parameter of the parameter set that defines the configuration of the dynamic characteristic compensation filter (for example, the phase lead filter or the band limit filter as described above). As described above, when the dynamic characteristic compensation filter is an FIR filter, the parameter set includes, for example, the number of taps, a weighting factor of each order, and the number of weighting factors other than 0. For example, in a case where the number of pieces of correction data of the memory 14 is equal to the number of taps, a order of a weighting factor other than 0 defines a phase section among a plurality of phase sections in which the correction data is read. At this time, the operation evaluation unit 25 may change a parameter in accordance with any of optimization techniques such as a Bayesian optimization method, a steepest descent method, or simulated annealing, for example. Then, the operation evaluation unit 25 obtains an evaluation value that is equal to or less than an allowable upper limit value corresponding to a predetermined condition and is also minimum among evaluation values acquired by executing calculation of an evaluation value and a change of a parameter for a predetermined number of times, and stores, in the memory 14, the parameter set corresponding to the minimum evaluation value as a parameter set to be used in the learning control processing.

Alternatively, as a parameter set to be used in the learning control processing, the operation evaluation unit 25 may store, in the memory 14, the parameter set that an evaluation value is equal to or less than the allowable upper limit value, and, also, the shortest distance to another parameter set having an evaluation value that exceeds the allowable upper limit value is maximum when calculation of an evaluation value and a change of a parameter are executed for a predetermined number of times. In this way, the operation evaluation unit 25 can extend the time required until a position deviation is increased in such a way that an evaluation value exceeds the allowable upper limit value even when a dynamic characteristic of the servomotor 3 changes due to deterioration over time of the servomotor 3 or the movable member 2.

Alternatively, as a parameter set to be used in the learning control processing, the operation evaluation unit 25 may store, when an evaluation value is equal to or less than the allowable upper limit value, the parameter set corresponding to the evaluation value in the memory 14. Further, when a speed command or a current command falls outside a predetermined allowable range, the operation evaluation unit 25 may not use the parameter set at that time.

When an evaluation value is equal to or less than a predetermined reference value during repetition of a change of a parameter, the operation evaluation unit 25 may reduce an amount of change of a value of the parameter to be smaller than an amount of change when the evaluation value is greater than the predetermined reference value. Note that the predetermined reference value is set to a value equal to or greater than the allowable upper limit value. Alternatively, when an evaluation value is equal to or less than the predetermined reference value during repetition of a change of a parameter, the operation evaluation unit 25 may reduce a range in which a value of the parameter is changed to be narrower than a range in which a value of the parameter is changed when the evaluation value is greater than the reference value.

Furthermore, during execution of the calibration processing or after completion of the calibration processing, the operation evaluation unit 25 may cause the display device of the user interface 11 to display, for each evaluation value, a value of a parameter being a change target of the dynamic characteristic compensation filter used for calculating the evaluation value in a display manner in accordance with the evaluation value.

FIG. 3 is a diagram illustrating one example of a display of a value of a parameter being a change target of the dynamic characteristic compensation filter. In this example, two weighting factors other than 0 are selected as parameters being change targets. In this case, for example, a dynamic characteristic compensation filter Gx(z) is expressed by the following equation.

$$Gx(z)=wxZ^x+wyZ^y$$

Herein, X and Y are each a order of an FIR filter, and $Z^x$ and $Z^y$ are each a value of correction data in the orders X and Y.

Then, wx and wy (wx≠0, wy≠0, wx+wy=1) are each a weighting factor in the orders X and Y. In a display screen 300 illustrated in FIG. 3, the filter order X that the correction data is multiplied by the predetermined weighting factor wx is indicated in a horizontal axis, and the filter order Y that the correction data is multiplied by the predetermined weighting factor wy is indicated in a vertical axis. When it is assumed as an example that the number of taps is 360 and a filter order is 1, $Z^1$ is a value acquired by reading in advance, from the memory 14, correction data before 359° from a certain phase section, i.e., correction data ahead of 1°. Then, an individual dot 301 represents a combination (X and Y) of the orders having an evaluation value which has been actually calculated. Further, the individual dot 301 is displayed in a display manner in response to an evaluation value calculated for a combination of weighting factors corresponding to the dot. For example, a dot 301*a* corresponding to a combination of weighting factors having an evaluation value equal to or less than the allowable upper limit value is displayed in green color. Meanwhile, a dot 301*b* corresponding to a combination of weighting factors having an evaluation value greater than the allowable upper limit value is displayed in orange color. Note that a shape, a size, or brightness of each dot may be changed in response to an evaluation value. For example, a shape of a dot when an evaluation value is equal to or less than the allowable upper limit value and a shape of a dot when an evaluation value is greater than the allowable upper limit value may be different from each other. Furthermore, a dot 301*c* corresponding to a combination of weighting factors selected to be used in the learning control processing by the operation evaluation unit 25 may be displayed in color (for example, blue color or black color) different from color of a dot corresponding to a combination of other weighting factors, or may be displayed in a flashing manner. Therefore, a user can visually perceive a combination of weighting factors having an evaluation value equal to or less than the allowable upper limit value, as indicated as a range surrounded by a dotted line 302, by looking at a distribution of the dots 301. Note that, when the user points to any of the dots with a cursor by using a mouse, the processor 15 may further cause the display device to display an evaluation value calculated for a combination of weighting factors corresponding to the dot, corresponding correction data, or information indicating whether or not a position deviation converges.

Furthermore, the user may be able to select a parameter set of the dynamic characteristic compensation filter to be used in the learning control processing by referring to the distribution of the dots displayed on the display screen. In this case, when an operation (for example, an operation of double-clicking specific coordinates) representing selecting a parameter set of the dynamic characteristic compensation filter to be used in the learning control processing is performed via the user interface 11, the user interface 11 may generate an operation signal representing the selection, and output the generated operation signal to the processor 15. Then, the processor 15 may determine the parameter set of the dynamic characteristic compensation filter to be used in the learning control processing in accordance with the operation signal, and store the parameter set in the memory 14.

Note that, when three or more parameters being change targets are present, the operation evaluation unit 25 may cause the display device to perform the display as described above for two arbitrary parameters among the parameters being the change targets. In this case, for example, a combination of the parameters to be displayed may be selected by an operation of the user via the user interface 11.

Figure 4A:
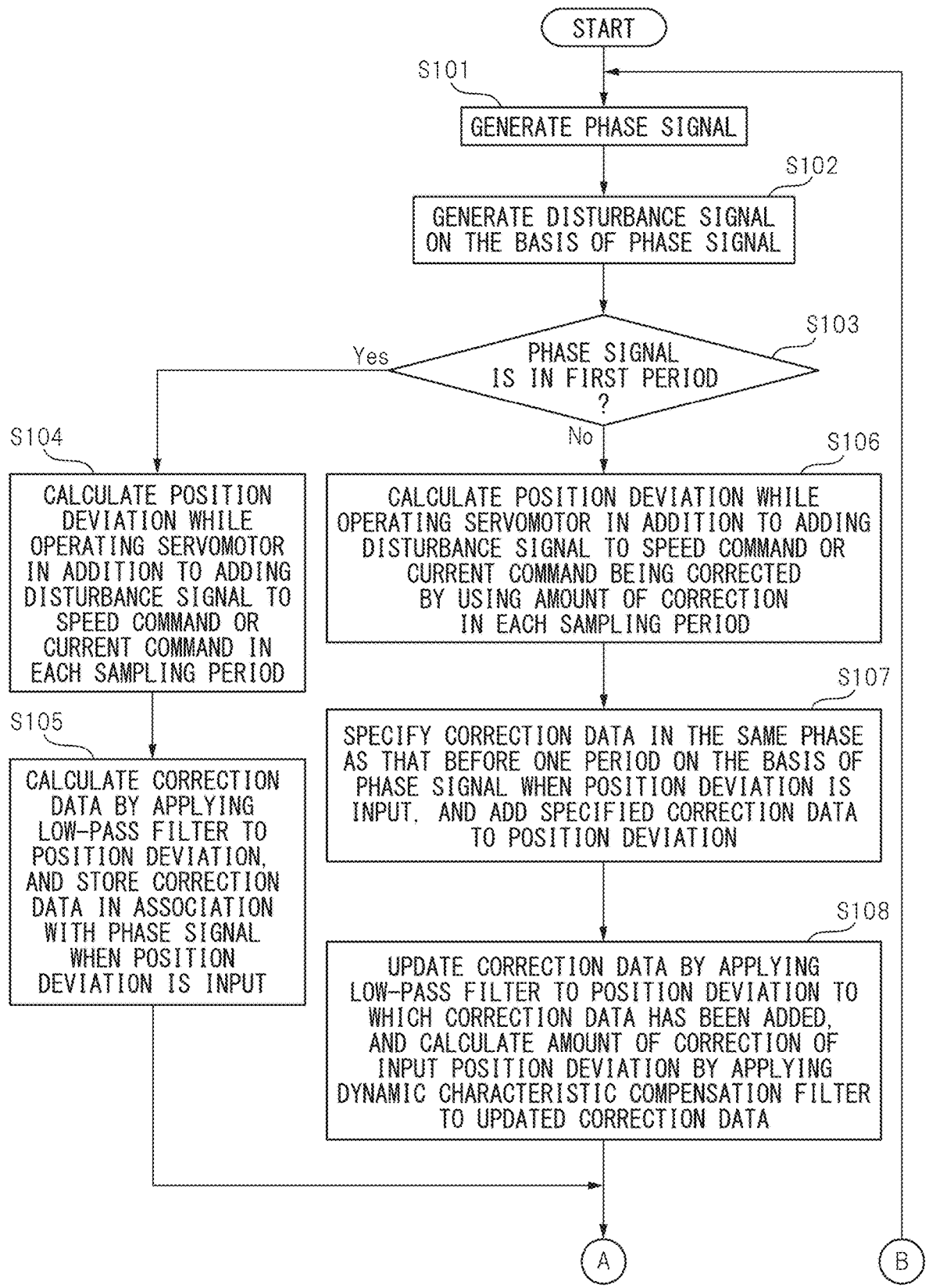
FIGS. 4A and 4B are each an operation flowchart of the calibration processing.
Figure 4B:
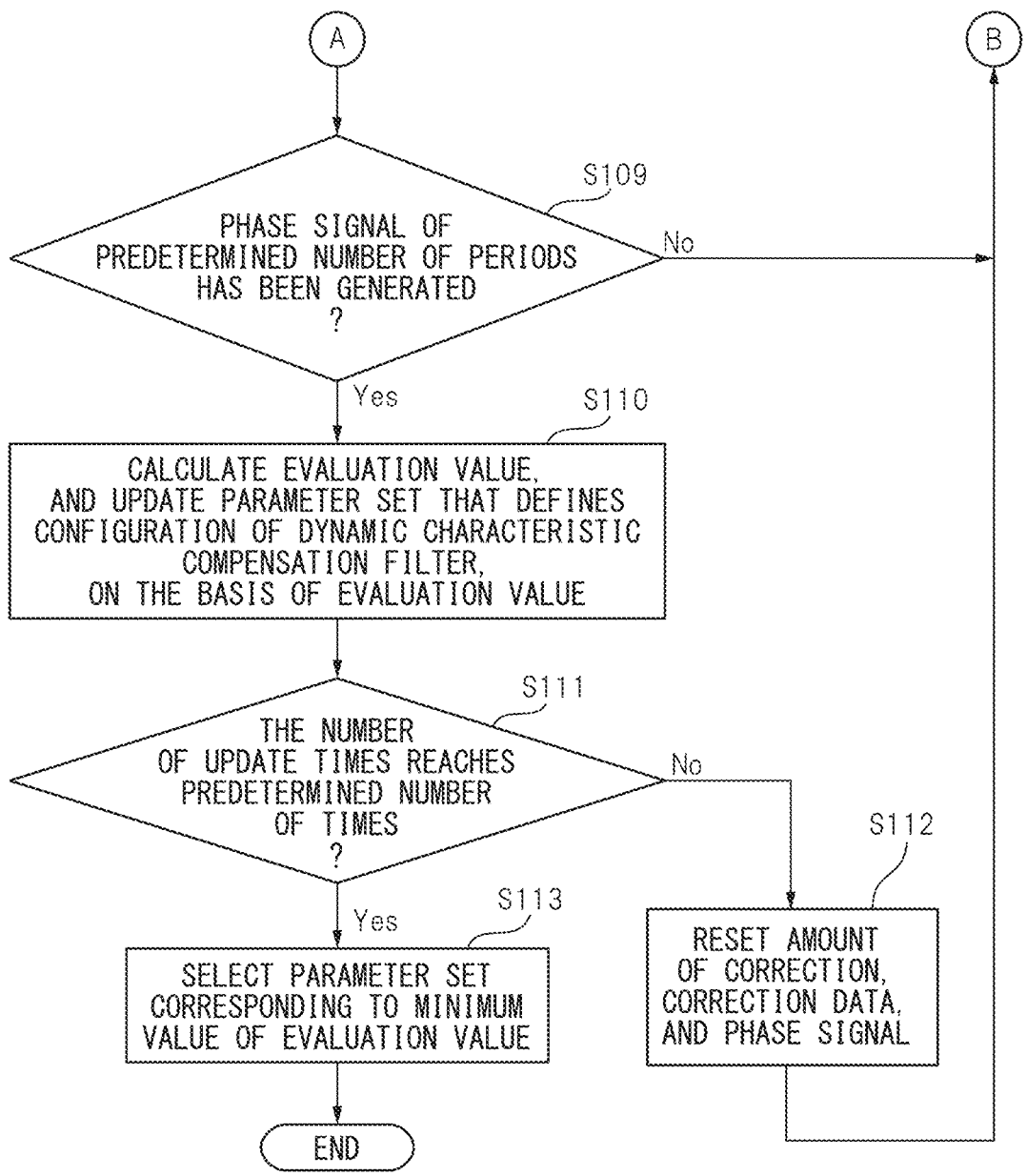

FIGS. 4A and 4B are each an operation flowchart of the calibration processing. The processor 15 executes the calibration processing in each period of a phase signal, i.e., each period of a disturbance signal in accordance with the following operation flowcharts.

As illustrated in FIG. 4A, the phase signal generation unit 22 generates a phase signal (step S101). The repetitive command generation unit 23 generates a disturbance signal representing periodic disturbance, based on the phase signal (step S102). The drive signal generation unit 21 determines whether or not the phase signal is in a first period (step S103). When the phase signal is in the first period (Yes in step S103), the drive signal generation unit 21 adds the disturbance signal to a speed command or a current command at each predetermined sampling period to generate the speed command or the current command to which disturbance is added. Then, the drive signal generation unit 21 operates the servomotor 3 in accordance with the speed command or the current command to which the disturbance is added, and calculates a position deviation between a target position of the movable member 2 indicated by a position command and an actual position of the movable member 2 measured by the position detector 4 (step S104). Each time the position deviation is input, the learning control unit 24 generates correction data, based on a phase signal when the position deviation is input, by applying the low-pass filter to the position deviation (step S105).

On the other hand, when the phase signal is not in the first period, i.e., when the phase signal is in a second or subsequent period (No in step S103), the drive signal generation unit 21 adds the disturbance signal to a speed command or a current command being corrected by using an amount of correction input from the learning control unit 24 at each predetermined sampling period to generate the speed command or the current command to which disturbance is added. Then, the drive signal generation unit 21 operates the servomotor 3 in accordance with the speed command or the current command to which the disturbance is added, and calculates a position deviation between a target position of the movable member 2 indicated by a position command and an actual position of the movable member 2 measured by the position detector 4 (step S106).

Each time the position deviation is input, the learning control unit 24 specifies, based on a phase signal when the position deviation is input, correction data in the same phase before one period reads the specified correction data from the memory 14, and adds the read correction data to the position deviation (step S107). Then, the learning control unit 24 updates the correction data by applying the low-pass filter to the position deviation to which the correction data are added, and calculates an amount of correction for the input position deviation by applying the dynamic characteristic compensation filter to the updated correction data (step S108).

As illustrated in FIG. 4B, after step S105 or S108, the operation evaluation unit 25 determines whether or not phase signals of a predetermined number of periods (i.e., a repetitive period) are generated (step S109). When the phase signals of the predetermined number of periods are not generated (No in step S109), the processor 15 repeats the processing in and after step S101. On the other hand, when the phase signals of the predetermined number of periods are generated (Yes in step S109), the operation evaluation unit 25 calculates an evaluation value, and updates a parameter set that defines a configuration of the dynamic characteristic compensation filter, based on the evaluation value (step S110).

The operation evaluation unit 25 determines whether or not the number of calculation times of the evaluation value and the number of update times of the parameter set reach a predetermined number of times (step S111). When the number of calculation times of the evaluation value and the number of update times of the parameter set do not reach the predetermined number of times (No in step S111), the processor 15 resets the amount of correction and the correction data by the parameter set before the update being stored in the memory 14, and the phase signal generation unit 22 resets the number of periods (i.e., the number of repetition times) of the phase signal (step S112). Then, the processor 15 repeats the processing in and after step S101.

On the other hand, when the number of calculation times of the evaluation value and the number of update times of the parameter set reach the predetermined number of times (Yes in Step S111), the operation evaluation unit 25 selects the parameter set corresponding to a minimum value of the evaluation value as a parameter set to be used in the learning control processing (step S113). Then, the processor 15 stores the selected parameter set in the memory 14, and completes the calibration processing.

Note that, in a case where a minimum value of the evaluation value exceeds the allowable upper limit value even when the number of calculation times of the evaluation value and the number of update times of the parameter set reach the predetermined number of times, the operation evaluation unit 25 may notify the user, via the user interface 11, that the evaluation value does not converge to equal to or less than the allowable upper limit value.

As described above, the control device of the motor changes a parameter set that defines a configuration of the dynamic characteristic compensation filter in such a way as to minimize an evaluation value representing magnitude of a position deviation in addition to adding a disturbance signal representing periodic disturbance in a simulated manner to a speed command or a current command for driving the servomotor. Thus, the control device can improve position control precision even when periodic disturbance is added while the movable member driven by the motor repeats a certain operation.

A computer program that achieves a function of each unit of the processor 15 of the control device 5 according to the embodiment or the modified example described above may be provided in form of being recorded in a computer-readable portable recording medium, such as a semiconductor memory, a magnetic recording medium, or an optical recording medium.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:

1. A control device of a motor that drives a movable member in such a way as to cause the movable member to repeat a certain operation, comprising:

a processor configured to:
    generate a phase signal having a predetermined period;
    generate a disturbance signal repeated in the predetermined period, based on the phase signal;
    for each predetermined sampling period, calculate a position deviation between a position of the movable member designated by a position command and a position of the movable member measured by a position detector, add an amount of correction for correcting the position deviation to the position deviation, add the disturbance signal to a drive signal for driving the motor being generated based on the position deviation to which the amount of correction is added, and cause the motor to operate based on the drive signal to which the disturbance signal is added;
    calculate the amount of correction by using a dynamic characteristic compensation filter for compensating for a dynamic characteristic of a control system of the motor in such a way as to reduce the position deviation;
    calculate, for each repetitive period including at least one of the predetermined periods, an evaluation value representing magnitude of the position deviation at each of the predetermined sampling periods in the repetitive period; and
    change a configuration of the dynamic characteristic compensation filter in such a way that the evaluation value satisfies a predetermined condition.

2. The control device according to claim 1, wherein the processor is configured to
    add, for each of the predetermined sampling periods, to the position deviation, correction data representing an amount of correction of a position deviation before one period in the predetermined period,
    calculate correction data at the sampling period by applying a low-pass filter to the position deviation to which the correction data are added, and
    calculate the amount of correction by applying the dynamic characteristic compensation filter to the correction data.

3. The control device according to claim 1, wherein
the dynamic characteristic compensation filter is a finite impulse response filter, and
the processor is configured to change a change parameter being at least one of the number of taps of the dynamic characteristic compensation filter, a weighting factor of each order, and the number of weighting factors other than 0 among weighting factors of each of orders in such a way that the evaluation value satisfies the predetermined condition.

4. The control device according to claim 3, wherein
the processor is configured to determine a value of the change parameter of the dynamic characteristic compensation filter in such a way that the value of the change parameter is the farthest from a value of the change parameter when the evaluation value is an allowable upper limit value that satisfies the predetermined condition.

5. The control device according to claim 3, wherein
the processor is configured to cause a display device to display the change parameter of the dynamic characteristic compensation filter in each of the predetermined periods in a display manner in accordance with a determination result of whether or not the evaluation value in the period satisfies the predetermined condition.

6. A non-transitory recording medium that stores a motor control computer program for controlling a motor that drives a movable member in such a way as to cause the movable member to repeat a certain operation, wherein the motor control computer program causes a computer to execute:
    generating a phase signal having a predetermined period;
    generating a disturbance signal repeated in the predetermined period, based on the phase signal;
    calculating, for each predetermined sampling period, a position deviation between a position of the movable member designated by a position command and a position of the movable member measured by a position detector, adding an amount of correction for correcting the position deviation to the position deviation, adding the disturbance signal to a drive signal for driving the motor being generated based on the position deviation to which the amount of correction is added, and causing the motor to operate based on the drive signal to which the disturbance signal is added;
    calculating the amount of correction by using a dynamic characteristic compensation filter for compensating for a dynamic characteristic of a control system of the motor in such a way as to reduce the position deviation;
    calculating, for each repetitive period including at least one of the predetermined periods, an evaluation value representing magnitude of the position deviation at each of the predetermined sampling periods in the repetitive period; and
    changing a configuration of the dynamic characteristic compensation filter in such a way that the evaluation value satisfies a predetermined condition.

7. The control device according to claim 1, wherein the processor is further configured, during execution of a calibration processing, to selectively
    (1) at each of the predetermined sampling periods, add a disturbance value of the generated disturbance signal to a current command value represented by a current command, and output the current command to which the disturbance value has been added as the drive signal for driving the motor, or
    (2) output, without changing, the received current command as the drive signal for driving the motor.

8. The control device according to claim 1, wherein the processor is further configured, during execution of a calibration processing, to selectively
    (1) at each of the predetermined sampling periods, add a disturbance value of the generated disturbance signal to a speed command value represented by a speed command, and output the speed command to which the disturbance value has been added for generating the drive signal, or
    (2) output, without changing, the received speed command for generating the drive signal.

9. The control device according to claim 1, wherein the processor is further configured, during execution of a calibration processing, at each of the predetermined sampling periods, and depending on a load on the motor, to selectively
    (1) add a disturbance value of the generated disturbance signal to a speed command value represented by a speed command, and generate a current command, as the drive signal, based on the speed command to which the disturbance value has been added, or
    (2) generate the current command based on the speed command without changing the speed command, add the disturbance value of the generated disturbance signal to a current command value represented by the current command, and output the current command to which the disturbance value has been added as the drive signal.

10. The control device according to claim 1, wherein the predetermined period is shorter than the predetermined sampling period.

* * * * *